INVENTORS
Robert B. Gelenius &
BY Robert E. Resseguie
W. C. Middleton
ATTORNEY 2,995,949
Patented Aug. 15, 1961

2,995,949
TRANSMISSION CONTROL SYSTEM
Robert B. Gelenius and Robert E. Resseguie, Flint, Mich., assignors to General Motors Corporation, Detroit, Mich., a corporation of Delaware
Filed Mar. 14, 1958, Ser. No. 721,451
19 Claims. (Cl. 74—472)

This invention relates to transmissions and particularly to combined electrical and hydraulic control systems therefor.

In automatic transmissions of the step ratio type, efforts are constantly being made to produce smooth and relatively imperceptible shifts, i.e., transitions from one speed ratio to another. Exemplary of the problem is a step ratio transmission employing plural sets of planetary gearing wherein brakes and clutches are utilized to condition each gear set for different drives, usually, either a reduced drive or a direct drive. Ideally, the shifts through the transmission should follow a definite pattern determined by the driver's desires and the torque characteristics of the particular vehicle engine being employed. To accomplish this with a hydraulic system, considerable valving is necessary with engine speed, vehicle speed, torque characteristics of the engine as well as those of the clutches and brakes, and torque demand being some of the factors to be considered in the design of the hydraulic control system. Furthermore, the complexity of such a hydraulic system increases with the number of shift points needed and the smoothness required of each shift.

With the foregoing in mind, the invention contemplates a simplified electrical control system for producing ratio changes in a vehicle transmission according to a predetermined scheme or pattern. Moreover, the invention proposes utilizing vehicle speed and engine torque demand for operating the electrical control system and establishing in part the shift pattern.

According to the invention, a control system of the foregoing character produces, in a novel manner, a signal voltage representative of vehicle speed and engine throttle position and then transfers this voltage to a relay circuit where a control voltage is developed for operating transmission ratio changing mechanism.

By the proposed electrical control system, a relay circuit is supplied with a signal voltage which, when of a predetermined amount, will cause an amplifying device to become conductive and afford a control voltage for operating transmission ratio changing mechanism.

More specifically, the invention affords a transmission control system in which relay operated valves supply pressure fluid to hydraulically operated ratio changing mechanisms for the transmission as determined by a control voltage derived from a relay circuit. The relay circuit which is connected to both a tachometer generator that produces a voltage corresponding to vehicle speed changes and a throttle actuated potentiometer which varies voltage supplied by a relatively constant source in accordance with throttle position processes a resultant signal voltage and determines when the relay for the relay operated valve should be energized to produce an ideal ratio change.

In carrying out the invention, according to one form thereof, planetary gearing is utilized to change drive ratios with control of the gearing being through the agency of brakes and clutches. The clutches are hydraulically actuated and the supply of fluid pressure to each is controlled by relay operated shift valves. An electrical network determines when the relays for these valves are to be energized so that the changes in ratio occur according to a preconceived pattern.

The network relies upon a tachometer generator to produce a vehicle speed conscious voltage and a throttle adjusted potentiometer for varying voltage from a relatively constant source with throttle position. The potentiometer and generator together develop a signal voltage which is supplied to relay circuits and these circuits, in turn, operate the relays for the valves. Each of the relay circuits is provided with a semi-conductor amplifying device and a relay which device is biased beyond cut-off so as to become conductive in response to a predetermined signal voltage and produce a control voltage for operating the associated relay.

In operation, the relay circuits become operative as determined by the amount of signal voltage and the cut-off level of the particular amplifying device. When an amplifying device becomes conductive, a control voltage is produced which, in turn, will energize the connected relay whereupon the appropriate valve is operated and a shift occurs. These relay circuits each become operative at different times as determined by the desired shift pattern.

The foregoing and other objects and advantages of the invention will be apparent from the following description and from the accompanying drawings, in which.

Figure 1:
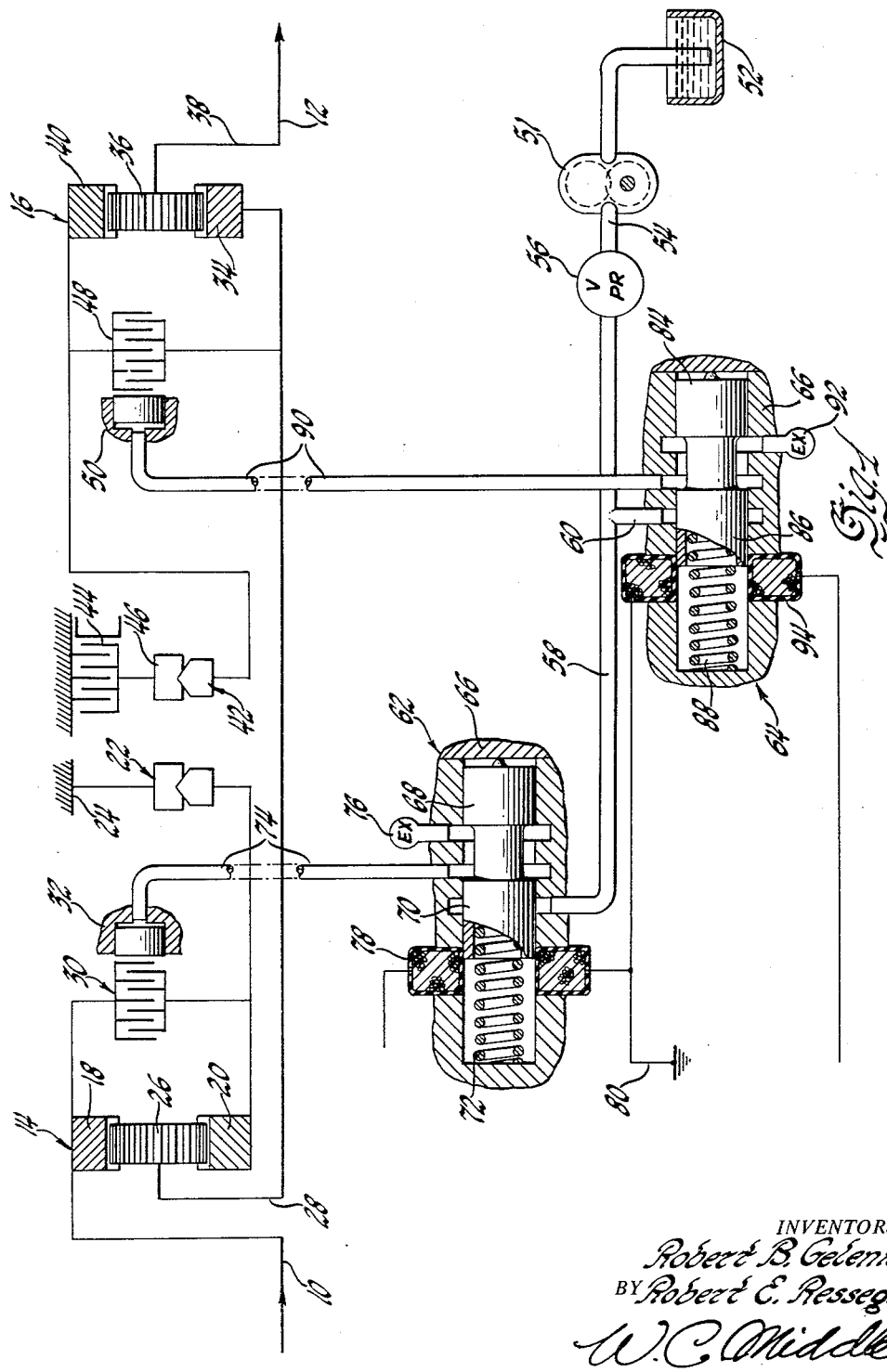
FIGURE 1 shows schematically a transmission and the hydraulic controls therefor arranged to demonstrate the invention.

Referring to the drawings and particularly to FIGURE 1, a transmission is illustrated schematically comprising a driving shaft 10 which may appropriately be clutched to a vehicle engine, not shown, and a driven shaft 12 suitably drive connected to the vehicle wheels. A front planetary gear unit 14 and a rear planetary gear unit 16 interconnect the shafts 10 and 12 and cooperate to provide four forward drive ratios therebetween.

The front planetary gear unit 14 has an input ring gear 18 connected to the driving shaft 10 and a reaction sun gear 20 restrained from reverse rotation by a one-way device which is grounded at 24. The one-way device 22 may be of any known construction utilizing sprags, rollers, or the like, to prevent relative rotation between two members in one direction and allow relative rotation therebetween in the opposite direction. Intermeshing with the ring and sun gears 18 and 20 are a series of planet pinions 26 journaled on a carrier 28 extending to the rear planetary gear unit 16. With the sun gear 20 prevented from reverse rotation, the forwardly rotated ring gear 18 will revolve the carrier 28 in the same forward direction but at a reduced speed. Direct drive through the gear unit 14 is afforded by a clutch 30 positioned between the ring and sun gears 18 and 20. The clutch 30 may be of any conventional structure, such as the multi-disk type illustrated, and engaged by a hydraulically operated servo motor 32. When the clutch 30 is engaged, the ring and sun gears 18 and 20 are caused to revolve together and, as a result, the unit 14 locks up with the carrier 28 being rotated at the same speed as the input ring gear 18.

As mentioned, the front unit carrier 28 transfers drive to the rear planetary gear unit 16. This is accomplished through a connection between the front unit carrier 28 and an input sun gear 34 for the rear unit 16. Sun gear 34 meshes with a series of planet pinions 36 journaled on a rear unit carrier 38 which, in turn, is connected to the driven shaft 12. Pinions 36 also mesh with a reaction ring gear 40 prevented from reverse rotation by the combined action of a one-way device 42 and a neutral brake 44 that holds an outer race 46 for the one-way device. The one-way device 42 is similar to the front unit one-way device 22 and likewise allows the reaction ring gear 40 to revolve forwardly unrestrained. Consequently, when the input sun gear 34 is driven forwardly, neutral brake 44 and the one-way device 42 will prevent the reaction ring gear 40 from rotating backwards and cause the output carrier 38 to drive the driven shaft 12 forwardly at a reduced speed. A clutch 48 like the front unit clutch 30 is interposed between the sun and ring gears 34 and 40 and is operated by a hydraulic servo motor 50. When the clutch 48 is engaged by the motor 50, direct drive is established between the input sun gear 34 and the output carrier 38, since the sun and ring gears 34 and 40 are tied together preventing relative rotation of the gears.

Neutral and the four forward drive ratios through the transmission are obtained as follows: In Neutral the front and rear unit clutches 30 and 48 and the neutral brake 44 are all disengaged. Disengaging the neutral brake 44 removes reaction for the rear unit ring gear 40 and insures that the rear unit 16 cannot transfer drive from the front unit 14 to the driven shaft 12. The front unit 14, because the sun gear 20 is prevented from revolving backwards by the front unit one-way device 22, will transfer drive to the rear unit 16 when the driving shaft 10 is revolved. Therefore, it is essential that the drive connection in the rear unit 16 be interrupted which the neutral brake 44 accomplishes. To initiate drive in the first speed available, the neutral brake 44 is engaged. Hence, both the front unit 14 and the rear unit 16 are conditioned for reduced drive as explained and the driven shaft 12 will be driven at a speed determined by the combined ratios afforded by the front and rear units 14 and 16. In second speed the front unit clutch 30 is engaged locking up the front unit 14 whereupon the driven shaft 12 is revolved at a rate determined entirely by the ratio provided in the rear unit 16. For third speed a double transition occurs inasmuch as the front clutch 30 is disengaged and the rear clutch 48 is engaged. Therefoe, the rear unit 16 is locked up and the front unit 14 is conditioned for reduced drive again. The driven shaft 12 then will be driven at a speed determined by the front unit 14. In fourth speed the front clutch 30 is re-engaged and both the front and rear units combine to provide a direct drive between the driving and driven shafts 10 and 12.

Pressure fluid for operating the front and rear unit servo motors 32 and 50 is derived from a pump 51, preferably driven at engine speed. The pump 51 draws fluid from a sump 52 and discharges into a main supply line 54 in which is located a conventional pressure regulating valve 56. The regulating valve 56 operates in a known manner to maintain the pressure in the system substantially constant at some predetermined amount. Communicating with the main supply passage 54 are branch lines 58 and 60 leading, respectively, to a front unit shift valve 62 and a rear unit shift valve 64, both of which are housed within bores in a valve body 66.

The front unit shift valve 62 is of the spool type comprising spaced lands 68 and 70 and is biased to the depicted position by a spring 72. In this position, the lands 68 and 70 establish communication between a front unit servo supply line 74 and an exhaust port 76, thus draining the front unit servo motor 32 and disengaging the front unit clutch 30. To move the valve 62 to the left, a relay 78 is utilized, the winding of which is grounded at 80. When the relay 78 is energized as will be explained, the valve 62 is drawn to the left so as to reposition the lands 68 and 70. In the new position communication between branch supply line 58 and the front unit servo supply line 74 is permitted by the lands 68 and 70 and the exhaust port 76 is closed by land 68. With the valve 62 in this latter position, the front unit clutch 30 will be engaged by pressure fluid supplied to the servo motor 32.

As illustrated, the rear unit shift valve 64 is similar to the front unit shift valve 62 and includes spaced lands 84 and 86. Also, the valve 64 is biased to the viewed position by a spring 88 in which position a rear unit servo supply line 90 is opened to an exhaust port 92 by the lands 84 and 86 and the clutch 48 is maintained disengaged. The valve 64 is shifted to the left by a relay 94, also grounded at 80, and operated as will be described. When shifted to the left, the lands 84 and 86 open branch supply line 60 to the rear unit servo supply line 90 and the land 84 closes exhaust port 92. With line 60 and 90 communicating in this manner, the rear unit clutch 48 is engaged by the hydraulic actuation of the rear unit servo 50.

Figure 2:
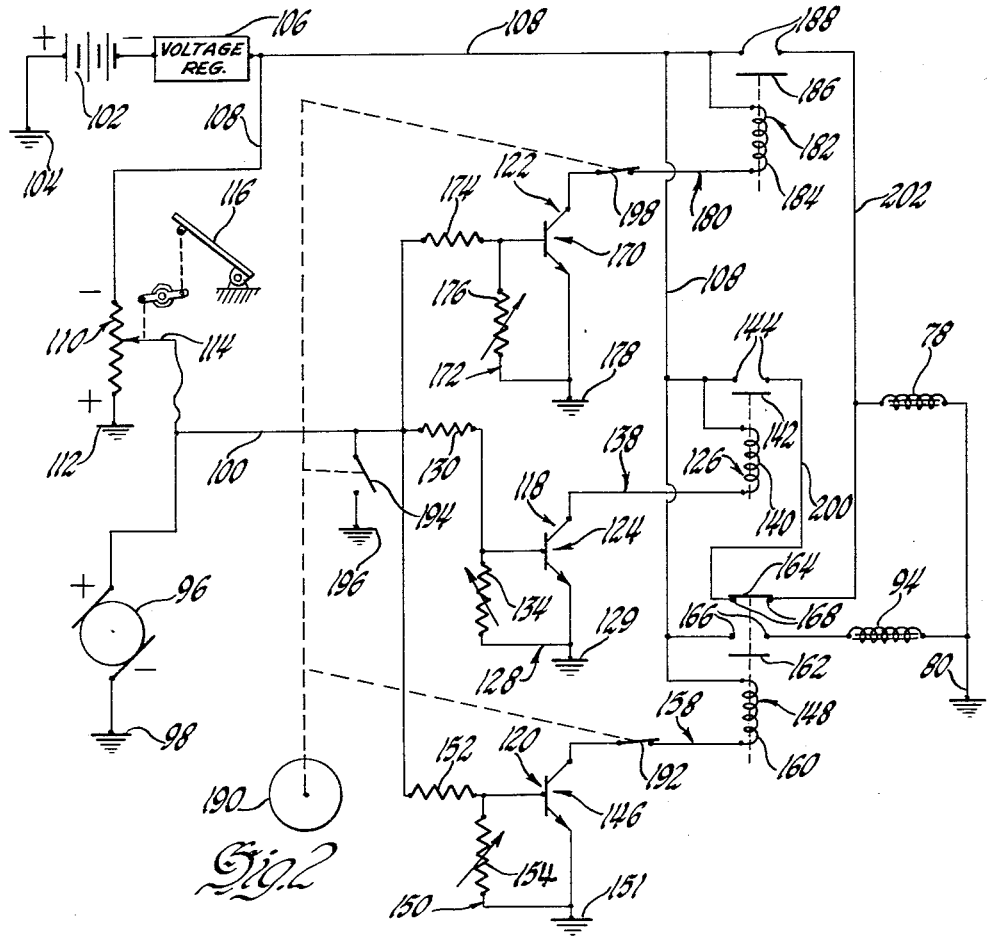
FIGURE 2 illustrates an electrical network for controlling the transmission hydraulic system.

The electrical network in FIGURE 2 develops a signal voltage reflective of engine torque demand and vehicle speed, which signal voltage is utilized to control the front and rear unit relays 78 and 94 according to a predetermined scheme or pattern. This is accomplished in part by a tachometer generator indicated, generally, at 96. Preferably the generator 96 is driven at the speed of the driven shaft 12 and has the negative terminal grounded at 98 and the positive terminal connected to a signal voltage supply conduit 100. The engine torque demand aspect is afforded by a battery 102, such as the conventional vehicle battery, which has the positive terminal grounded at 104 and the negative terminal connected to a suitable voltage regulator, denoted generally at 106, which, in turn, is connected to a main battery supply conductor 108. The voltage regulator 106 insures that the voltage supplied by the conductor 108 is relatively constant and in some applications may not be necessary if the voltage source is not subject to fluctuations. One end of the main supply conductor 108 is connected to a potentiometer 110 grounded at 112. The potentiometer 110 has an arm 114 thereof connected, e.g., to an accelerator pedal 116 so that the position of this arm 114 will correspond to the position of the engine throttle and reflect changes in the torque demand on the engine.

The accelerator pedal 116 is arranged so that when depressed the potentiometer arm 114 will move upwardly and provide a greater negative voltage for opposing the positive voltage developed by the tachometer generator 96. These two voltages will, therefore, result in a signal voltage in the conductor 100, which will be determined by the dominant voltage. That is, if the negative voltage is sufficient to overcome the positive voltage, a negative voltage will be supplied to the conductor 100, while on the other hnad, if the positive voltage is dominant then the signal voltage will be positive.

The signal voltage developed, as just described, is then transferred to the relay circuitry comprising, generally, a first to second speed relay circuit 118, a second to third relay circuit 120 and a third to fourth relay circuit 122. Each relay circuit produces a control voltage that is employed to energize the front and rear unit relays 78 and 94 and change the transmission ratios.

The first to second relay circuit 118 comprises an amplifying device, which is preferably of the semi-conductor type, such as a transistor 124, and a single pole relay 126. The transistor 124 is of the character having base, emitter and collector electrodes with an input circuit 128 extending between the base and emitter electrodes of the transistor and to ground at 129. Included in circuit 128 is a resistor 130 joined to the signal voltage supply conductor 100 and an adjustable bias resistor 134 connected to an appropriate negative bias voltage source. An output circuit 138 for the transistor 124 extends from the ground 129 through the emitter and collector electrodes to a winding 140 for the relay 126. The relay 126 also has a movable contact 142 which is engageable with a pair of fixed contacts 144. The bias resistor 134 is adjusted so that when the signal voltage attains a sufficient positive value beyond the adjusted cut-off for the transistor 124, the transistor 124 will fire and a control voltage will be supplied to the transistor output circuit 138. This control voltage will energize the winding 140 for the relay 126 and cause the movable contact 142 to engage the fixed contacts 144.

The second to third speed relay circuit 120 is somewhat similar to the first to second speed relay circuit 118 and includes a transistor 146 and a double pole relay 148. A transistor input circuit, denoted generally at 150, extends from the signal voltage supply conductor 100 between the transistor base and emitter electrodes to ground at 151, and includes a resistor 152 and an adjustable bias resistor 154 connected to a negative bias voltage source in a manner like the bias resistor 134. An output circuit 158 for transistor 146 extends from ground 151 through the collector and emitter electrodes to a winding 160 for the double pole relay 148. The double pole relay 148 has two movable contacts 162 and 164 cooperating, respectively, with fixed contacts 166 and 168. The relay 148 is normally in the position shown with the movable contact 164 engaging the fixed contacts 168, but when the transistor 146 is fired so as to produce a control voltage in the output circuit 158, the winding 160 will be energized to shift the movable contact 162 upwardly into engagement with the fixed contacts 166 and at the same time disengage the movable contact 164 from the fixed contacts 168.

Also similar to the first to second speed relay circuit 118, the third to fourth speed relay circuit 122 has a transistor 170 with an input circuit 172 including a resistor 174 and an adjustable bias resistor 176 connected to a negative bias voltage source and extending from the signal voltage supply conductor 100 between the base and emitter electrodes of the transistor to ground at 178. The output circuit for the transistor 170 has one end grounded at 178 and extends between the emitter and collector terminals of the transistor 170 to a single pole relay 182. When a control voltage is developed in the transistor output circuit 180, a winding 184 for the relay 182 is energized and causes a movable contact 186 to engage fixed contacts 188.

So that the driver can have available different transmission ranges of operation, a selector element 190, conveniently accessible to the driver, is connected to a switch 192 in the output circuit 158 of the second to third speed transistor 146, a switch 194 arranged to ground the signal voltage supply conductor 100 at 196, and a switch 198 in the output circuit 180 of the third to fourth speed transistor 170. The operation of these switches and the selector 190 will be described in the following operational summary.

To explain the operation of the control system, assume that the selector element 190 is positioned in Drive Range so that the switches 192 and 198 are closed and the switch 194 is open, and also that the relays 126, 148 and 182 are in the positions depicted in the FIGURE 2. With the relays so positioned, the front unit shift valve relay 78 and the rear unit shift valve relay 94 will both be de-energized and the front and rear unit shift valves 62 and 64 will be in the FIGURE 1 positions. With the engine operating and the neutral clutch 44 engaged, the vehicle will proceed in first speed since both the front and rear units 14 and 16 will be conditioned for first speed drive as has been discussed.

Figure 3:
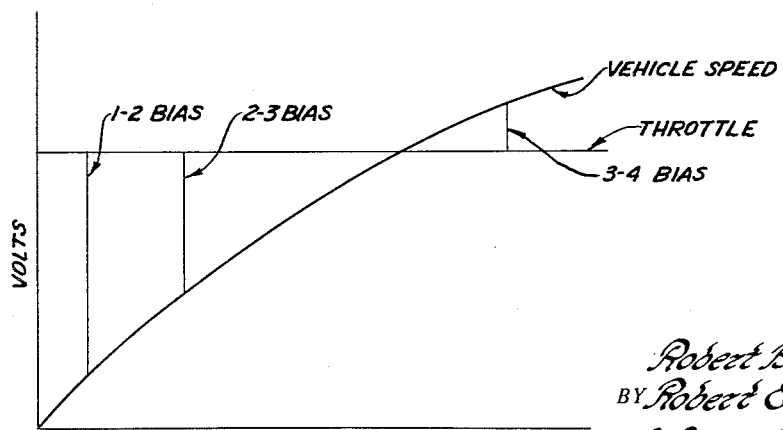
FIGURE 3 is a graphical showing of factors affecting the transmission shift points.

To assist further in understanding the operation, reference is made to the graphical representation of FIGURE 3 wherein the curve marked "vehicle speed" corresponds to the voltage developed by the tachometer generator 96 and the curve denoted "throttle" represents the voltage supplied to the signal voltage supply conductor 100 from potentiometer 110. For purposes of clarity polarity has been ignored and the values from the curves are to be considered absolute. With the throttle voltage maintained constant for demonstration purposes and as vehicle speed increases, the first bias level, determined by bias resistor 134, will be reached whereupon the first to second speed transistor 124 will fire and the first to second speed shift will be made. Similarly, the second to third and third to fourth speed transistors 146 and 170 will fire as vehicle speed further increases and the respective signal level for each is attained resulting in the second to third and third to fourth speed shifts. The magnitude of each bias signal is shown by the distance between the "vehicle speed" and "throttle" curves and these values are selected for the desired shift points. Although the "throttle" curve is shown with a fixed value, it actually changes, i.e., rises and falls with relation to the throttle settings determined by the accelerator pedal 116. Thus, at an increased throttle setting, resulting from depression of the accelerator pedal 116, a greater vehicle speed is necessary before the bias equivalent signal is available to fire the transistors.

With the foregoing assumptions and explanation in mind, when vehicle speed is enough to cause the tachometer generator 96 to generate the necessary positive voltage for overcoming the negative voltage from the potentiometer 110, a resultant positive signal voltage will be transferred by the signal voltage supply conductor 100 to each of the relay circuits 118, 120, and 122. With each of the transistors in these circuits afforded a different negative bias, the first to second speed transistor 124 will be the first to fire. The control voltage then developed in the output circuit 138 for transistor 124 will cause the relay 126 to close and a circuit will be completed extending from the battery 102 via battery supply voltage conductor 108 through a conductor 200, the movable contact 164 for relay 148 being engaged with the fixed contact 168, to the front unit shift valve relay 78. The front unit shift valve 62 will be moved to the upshifted position and supply pressure fluid to the front unit servo 32 so as to engage the front unit clutch 30 and establish second speed.

Upon further increase in speed of the vehicle, a greater positive signal voltage will be provided to the input circuit 150 for the second to third speed transistor 146, which signal voltage will be sufficiently positive in proportion to the negative bias voltage from the bias resistor 154 to cause transistor 146 to fire. The control voltage developed in the transistor output circuit 158 will cause the relay 148 to become operative so that the movable contact 162 will engage the fixed contacts 166, while the movable contact 164 will move out of engagement with the fixed contacts 168. The circuit from the battery 102 via conductor 108 is now completed to the rear unit shift valve relay 94 and that to the front unit shift valve 78 is interrupted due to the opening of the contacts 164 and 168. The front unit shift valve 62 then disengages the front unit clutch 30 and the rear unit shift valve 64 supplies fluid pressure to the rear unit clutch 48 effecting an engagement thereof for third speed.

When the signal voltage in the conductor 100 attains a still greater value, with a further increase in vehicle speed, the negative bias voltage from bias resistor 176 will be overcome and transistor 170 will fire causing the third to fourth speed relay circuit 122 to become operative. The resultant control voltage in the transistor output circuit 180 will cause the relay 182 to close at which time the movable contact 186 will engage the fixed contacts 188. The operation of the relay 182 completes the circuit from the battery 102 through conductors 108 and 202 so as to energize the front unit shift valve relay 78. The front unit shift valve 62 will then be re-positioned and supply fluid pressure to the front unit servo 32 engaging the front unit clutch 30. The transmission is now conditioned for direct drive or fourth speed.

To establish additional transmission ranges, the selector element 190 is operated so that for Low Range, switch 192 is opened. Therefore, a shift from the second speed to third speed cannot be made and only the first two speeds will be available. For an Intermediate Range, switch 198 is opened, while switch 192 is maintained closed. Relay 182 cannot be operated and consequently fourth speed is unobtainable. The Intermediate Range then provides three speeds.

Neutral can be obtained by closing the switch 194.

This will short out the signal voltage supply conductor 100 and maintain the front and rear units in reduction. Then, by suitable mechanism (not shown) correlated with selector element 190, the neutral brake 44 may be disengaged to complete the conditioning of the transmission for Neutral.

As can be seen, the invention provides a combined electrical and hydraulic transmission control system with the electrical part constructed to duplicate any desired shift pattern. The electrical network is considerably simplified employing a minimum number of components while still being easily altered for different installations. The major shift control factors, namely, vehicle speed and throttle position, are correlated in a novel way to obtain proper shift timing essential for smooth transitions from one ratio to another in a multi-step ratio transmission.

The invention is to be limited only by the following claims.

We claim:

1. In a transmission for a vehicle of the character driven by a throttle controlled engine; the combination comprising means for developing a signal voltage corresponding both to throttle position and vehicle speed; ratio changing means for varying drive through the transmission; and a relay circuit including an amplifying device responsive to the signal voltage for developing a control voltage, and a relay operated by the control voltage for controlling the ratio changing means.

2. In a transmission for a vehicle of the character driven by a throttle controlled engine; the combination comprising means for developing a signal voltage corresponding both to throttle position and vehicle speed; ratio changing means for varying drive through the transmission; and circuit means responsive to the signal voltage, the circuit means including a series of amplifying devices each biased to different levels corresponding respectively to desired ratio changing speeds, and means controlled by the amplifying devices for causing the ratio changing means to alter the drive through the transmission as the different amplifying devices become operative.

3. In a transmission for a vehicle of the character driven by a throttle controlled engine; the combination comprising means for developing a signal voltage corresponding both to throttle position and vehicle speed; ratio changing means for varying drive through the transmission; and a relay circuit including an amplifying device having emitter, collector, and control electrodes, an input circuit for the amplifying device including the signal voltage developing means and extending between the control and emitter electrodes, an output circuit for the amplifying device extending between the emitter and collector electrodes, and a relay operated by the output circuit for controlling the ratio changing means.

4. In a vehicle transmission control system for a throttle controlled engine; the combination comprising means for developing a signal voltage corresponding both to throttle position and vehicle speed; ratio changing means for varying drive through the transmission; and a relay circuit including a semi-conductor amplifying device biased beyond cut-off and responding to a predetermined signal voltage so as to produce a control voltage, means for adjusting the bias of the amplifying device to a predetermined level, and a relay operated by the control voltage for controlling the ratio changing means.

5. In a vehicle transmission control system for a throttle controlled engine; the combination comprising means for developing a signal voltage corresponding both to throttle position and vehicle speed; ratio changing means for varying drive through the transmission; and a relay circuit including a transistor biased beyond cut-off and responding to a predetermined signal voltage for producing a control voltage, means for adjusting the bias of the transistor to a predetermined level, and a relay operated by the control voltage for controlling the ratio changing means.

6. In a transmission for a vehicle of the character driven by a throttle controlled engine; the combination comprising means for producing a vehicle speed conscious voltage; voltage dividing means for providing a voltage corresponding to throttle position; means connected with both the voltage dividing means and the vehicle speed conscious voltage producing means for differentially combining the voltages therefrom so as to provide a resultant signal voltage; ratio changing means for varying the drive through the transmission; and a relay circuit including an amplifying device responsive to the signal voltage from the differentially combining means for developing a control voltage, and a relay operated by the control voltage for controlling the ratio changing means.

7. In a vehicle transmission control system for a throttle controlled engine; the combination comprising means for producing a vehicle speed conscious voltage; voltage dividing means for providing a voltage corresponding to throttle position, impedance means connected with both the voltage dividing means and the vehicle speed conscious voltage producing means for differentially combining the voltage therefrom so as to provide a resultant signal voltage; ratio changing means for varying the drive through the transmission; and a relay circuit including an amplifying device provided with biasing means for adjusting the bias of the amplifying device to a predetermined level and responsive to the signal voltage from the impedance means for developing a control voltage, and a relay operated by the control voltage for controlling the ratio changing means.

8. In a vehicle transmission control system for a throttle controlled engine; the combination comprising means for producing a vehicle speed conscious voltage; voltage dividing means for providing a voltage corresponding to throttle position; impedance means connected with both the voltage dividing means and the vehicle speed conscious voltage producing means for differentially combining the voltages therefrom so as to provide a resultant signal voltage; ratio changing means for varying the drive through the transmission; and a relay circuit including a semi-conductor amplifying device biased beyond the cut-off and responding to a predetermined signal voltage from the impedance means for developing a control voltage, means for adjusting the bias of the amplifying device to a predetermined level, and a relay operated by the control voltage for controlling the ratio changing means.

9. In a vehicle transmission control system for a throttle controlled engine; the combination comprising means for producing a vehicle speed conscious voltage; a potentiometer operated by the throttle for providing a voltage representative of throttle position; impedance means connected with both the potentiometer and the vehicle speed conscious voltage producing means for differentially combining the voltages therefrom so as to provide a resultant signal voltage; ratio changing means for varying the drive through the transmission; and a relay circuit including a semi-conductor amplifying device biased beyond cut-off and responding to a predetermined signal voltage to produce a control voltage, means for adjusting the bias of the amplifying device to a predetermined level, and a relay operated by the control voltage for controlling the ratio changing means.

10. In a vehicle transmission control system for a throttle controlled engine; the combination comprising a generator for producing a vehicle speed conscious voltage; a source of relatively constant voltage; a potentiometer cooperating with the source of voltage and the throttle to provide a voltage representative of throttle position; resistor means connected with both the generator and the potentiometer for differentially combining the voltages therefrom so as to provide a resultant signal voltage; ratio changing means for varying the drive through the transmission; and a relay circuit including an amplifying device having emitter, collector, and control electrodes, an input circuit for the amplifying device including the resistor means and extending between the control and emitter electrodes, an output circuit for the amplifying device extending between the emitter and collector electrodes, and a relay operated by the output circuit for controlling the ratio changing means.

11. In a vehicle transmission control system for a throttle controlled engine; the combination comprising a generator for producing a vehicle speed conscious voltage; a source of relatively constant voltage; adjustable voltage dividing means operated by the throttle and connected to the source of voltage for providing a voltage representative of throttle position; resistor means connected with both the voltage dividing means and the generator for differentially combining the voltages therefrom to afford a resultant signal voltage; ratio changing means for varying the drive through the transmission; and a relay circuit including a semi-conductor amplifying device biased beyond cut-off and responding to a predetermined signal voltage so as to produce a control voltage, means for adjusting the bias of the amplifying device to a predetermined level, and a relay operated by the control voltage for controlling the ratio changing means.

12. In a transmission for a vehicle of the character driven by a throttle controlled engine; the combination comprising driving and driven means; gearing interposed between the driving and driven means; ratio changing mechanism for so conditioning the gearing as to provide a plurality of drive ratios therethrough; means for developing a signal voltage corresponding to throttle position and vehicle speed; and a relay circuit including an amplifying device responsive to the signal voltage for developing a control voltage, and a relay operated by the control voltage for controlling the ratio changing mechanism.

13. In a transmission for a vehicle of the character driven by a throttle controlled engine; the combination comprising driving and driven means; gearing interposed between the driving and driven means; ratio changing mechanism for so conditioning the gearing as to provide a plurality of drive ratios therethrough; means for developing a signal voltage corresponding to throttle position and vehicle speed; and a relay circuit including a semi-conductor amplifying device biased beyond cut-off and responding to a predetermined signal voltage so as to produce a control voltage, and a relay operated by the control voltage for controlling the ratio changing means.

14. In a transmission for a throttle controlled engine; the combination comprising driving and driven means; gearing interposed between the driving and driven means; ratio changing mechanism for so conditioning the gearing as to provide a plurality of drive ratios therethrough; a generator for producing a vehicle speed conscious voltage; a source of relatively constant voltage; a potentiometer coacting with the source of voltage to provide a voltage representative of throttle position; resistor means connected with both the tachometer generator and the potentiometer for differentially combining the voltages therefrom so as to afford a resultant signal voltage; and a relay circuit including a semi-conductor amplifying device biased beyond cut-off and responding to a predetermined signal voltage so as to produce a control voltage, means for adjusting the bias of the amplifying device to a predetermined level, and a relay operated by the control voltage for controlling the ratio changing mechanism.

15. In a transmission for a vehicle of the character driven by a throttle controlled engine; the combination comprising driving and driven shafts; planetary gearing interposed between the driving and driven shafts; hydraulically operated ratio changing mechanism for so conditioning the gearing as to provide a plurality of drive ratios therethrough; a source of pressure fluid a relay operated shift valve train for supplying pressure fluid from the source to the ratio changing mechanism; means for developing a signal voltage corresponding to throttle position and vehicle speed; and a relay circuit including an amplifying device responsive to the signal voltage for developing a control voltage, and a relay operated by the control voltage for controlling the relay operated shift valve train.

16. In a vehicle transmission for a throttle controlled engine; the combination comprising driving and driven shafts; planetary gearing interposed between the driving and driven shafts; hydraulically operated ratio changing mechanism for so conditioning the gearing as to provide a plurality of drive ratios therethrough; a source of pressure fluid; a relay operated shift valve train for supplying pressure fluid from the source to the ratio changing mechanism; a plurality of relay circuits; means for developing a signal voltage corresponding to throttle position and vehicle speed; and manually operated means for controlling selectively the relay circuits to afford different drive ranges of operation through the transmission, each of the relay circuits including an amplifying device responsive to the signal voltage for developing a control voltage, and a relay operated by the control voltage for controlling the relay operated shift valve train so as to cause the drive ratio through the transmission to be changed by the ratio changing mechanism.

17. In a vehicle transmission for a throttle controlled engine; the combination comprising driving and driven shafts; planetary gearing interposed between the driving and driven shafts; hydraulically operated ratio changing mechanism for so conditioning the gearing as to provide a plurality of drive ratios therethrough; a source of pressure fluid; a relay operated shift valve train for supplying pressure fluid from the source to the ratio changing mechanism; a generator drive connected to the driven shaft for producing a voltage that varies with the speed of the driven shaft; a source of relatively constant voltage; a potentiometer cooperating with the throttle and the source of voltage to provide a voltage that varies with changes in throttle position; impedance means connected with both the generator and the potentiometer for differentially combining the voltages therefrom so as to afford a resultant signal voltage; and a plurality of relay circuits each including a semi-conductor amplifying device biased beyond cut-off and responding to a predetermined signal voltage from the impedance means so as to produce a control voltage, and a relay operated by the control voltage for controlling the shift valve train so as to cause the drive ratio through the transmission to be changed by the ratio changing mechanism.

18. In a vehicle transmission for a throttle controlled engine; the combination comprising driving and driven shafts; planetary gearing interposed between the driving and driven shafts; hydraulically operated ratio changing mechanism for so conditioning the gearing as to provide a plurality of different ratios therethrough; a source of pressure fluid; a relay operated shift valve train for supplying pressure fluid from the source to the ratio changing mechanism; a generator drive connected to the driven shaft for producing a voltage that varies with the speed of the driven shaft; a source of relatively constant voltage; a potentiometer cooperating with the throttle and the source of voltage to provide a voltage that varies with changes in throttle position; resistor means connected with both the generator and the potentiometer for differentially combining the voltages therefrom so as to provide a resultant signal voltage; and a plurality of relay circuits, each relay circuit including an amplifying device having emitter, collector and control electrodes, an input circuit for the amplifying device including the resistor means and extending between the control and emitter electrodes, an output circuit for the amplifying device extending between the emitter and collector electrodes, means for adjusting the bias of the amplifying device to a predetermined level, and a relay operated by the output circuit of the amplifying device for controlling the shift valve train so as to cause the drive ratio through the transmission to be changed by the ratio changing mechanism.

19. In a transmission for an engine driven vehicle; the combination comprising means for developing a signal voltage corresponding both to engine torque demand and vehicle speed; ratio changing means for varying drive through the transmission; and a relay circuit responsive to the signal voltage, the relay circuit including a series of amplifying devices each responsive to the signal voltage and biased to different levels and a plurality of relays operated by the devices for controlling the ratio changing means so as to alter the drive through the transmission as the different amplifying devices become operative.

References Cited in the file of this patent

UNITED STATES PATENTS

| | | |
|---|---|---|
| 2,615,349 | Winther | Oct. 28, 1952 |
| 2,647,411 | Filocamo | Aug. 4, 1953 |
| 2,839,944 | Von Rucker | June 24, 1958 |
| 2,855,794 | Faisandier | Oct. 14, 1958 |
| 2,910,884 | Peras | Nov. 3, 1959 |
| 2,927,474 | Peras | Mar. 8, 1960 |

FOREIGN PATENTS

| | | |
|---|---|---|
| 1,102,758 | France | May 11, 1955 |
| 1,134,285 | France | Nov. 26, 1956 |